United States Patent
Robbins

(10) Patent No.: US 9,191,521 B2
(45) Date of Patent: *Nov. 17, 2015

(54) METHOD AND SYSTEM FOR PROVIDING CALL WAITING FEATURES IN A SIP-BASED NETWORK

(71) Applicant: Verizon Patent and Licensing Inc., Basking Ridge, NJ (US)

(72) Inventor: David C. Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 382 days.

This patent is subject to a terminal disclaimer.

(21) Appl. No.: 13/751,398

(22) Filed: Jan. 28, 2013

(65) Prior Publication Data

US 2013/0138821 A1    May 30, 2013

Related U.S. Application Data

(63) Continuation of application No. 11/534,426, filed on Sep. 22, 2006, now Pat. No. 8,374,166.

(60) Provisional application No. 60/719,465, filed on Sep. 22, 2005.

(51) Int. Cl.
*H04L 29/06* (2006.01)
*H04M 11/04* (2006.01)

(52) U.S. Cl.
CPC ............ *H04M 11/04* (2013.01); *H04L 65/1006* (2013.01); *H04L 65/1069* (2013.01); *H04L 65/1076* (2013.01); *H04L 65/1096* (2013.01)

(58) Field of Classification Search
CPC ............ H04L 65/1096; H04L 65/1076; H04L 65/1069; H04L 65/1006; H04M 3/4288
See application file for complete search history.

(56) References Cited

U.S. PATENT DOCUMENTS

| | | |
|---|---|---|
| 3,737,587 A | 6/1973 | Romero |
| 4,154,987 A | 5/1979 | Rosenberg et al. |
| 4,528,424 A | 7/1985 | Middleton et al. |
| 4,723,271 A | 2/1988 | Grundtisch |
| 4,741,024 A | 4/1988 | Del Monte et al. |
| 4,950,011 A | 8/1990 | Borcea et al. |
| 5,165,095 A | 11/1992 | Borcherding |
| 5,255,314 A | 10/1993 | Applegate et al. |
| 5,323,444 A | 6/1994 | Ertz et al. |
| 5,471,519 A | 11/1995 | Howe et al. |

(Continued)

OTHER PUBLICATIONS

"AINGR: Switching Systems, (a module of AINGR, FR-15)," Telcordia Technologies Generic Requirements, GR-1298-CORE, Issue 6, 1226 pages, Nov. 2000.

(Continued)

*Primary Examiner* — Omer S Mian

(57) ABSTRACT

A method that includes receiving a first call request from a second user to a first user, establishing a first dialog between a network element and the first user, establishing a second dialog between the network element and the second user, establishing a third dialog between the network element and a third user in response to a second call request from a third user, establishing a fourth dialog between the network element and the first user as a result of establishing the third dialog, waiting for a response from the first user in the fourth dialog and receiving one or more indications of actions from the first user to manage the disposition of the second call request.

24 Claims, 8 Drawing Sheets

(56) References Cited

U.S. PATENT DOCUMENTS

| | | | |
|---|---|---|---|
| 5,475,745 A | 12/1995 | Boyle | |
| 5,619,561 A | 4/1997 | Reese | |
| 5,758,284 A | 5/1998 | Chavez, Jr. et al. | |
| 5,815,550 A | 9/1998 | Miller | |
| 5,835,570 A | 11/1998 | Wattenbarger | |
| 5,913,166 A | 6/1999 | Buttitta et al. | |
| 5,970,134 A | 10/1999 | Highland et al. | |
| 5,999,610 A | 12/1999 | Lin et al. | |
| 6,021,176 A | 2/2000 | McKendry et al. | |
| 6,026,156 A | 2/2000 | Epler et al. | |
| 6,031,896 A | 2/2000 | Gardell et al. | |
| 6,072,865 A | 6/2000 | Haber et al. | |
| 6,208,726 B1 | 3/2001 | Bansal et al. | |
| 6,219,414 B1 | 4/2001 | Maciejewski et al. | |
| 6,308,726 B2 | 10/2001 | Sato et al. | |
| 6,337,898 B1 | 1/2002 | Gordon | |
| 6,339,639 B1 | 1/2002 | Henderson | |
| 6,404,876 B1 | 6/2002 | Smith et al. | |
| 6,453,040 B1 | 9/2002 | Burke et al. | |
| 6,484,196 B1 | 11/2002 | Maurille | |
| 6,510,315 B1 | 1/2003 | Arnson | |
| 6,636,594 B1 | 10/2003 | Oran | |
| 6,735,295 B1 | 5/2004 | Brennan et al. | |
| 6,741,695 B1 | 5/2004 | McConnell et al. | |
| 6,744,877 B1 | 6/2004 | Edwards | |
| 6,754,325 B1 | 6/2004 | Silver et al. | |
| 6,801,604 B2 | 10/2004 | Maes et al. | |
| 6,807,259 B1 | 10/2004 | Patel et al. | |
| 6,826,174 B1 | 11/2004 | Erekson et al. | |
| 6,834,048 B1 | 12/2004 | Cho et al. | |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1 | 4/2005 | Takeda | |
| 6,879,673 B2 | 4/2005 | Creamer et al. | |
| 6,954,521 B2 | 10/2005 | Bull et al. | |
| 6,954,524 B2 | 10/2005 | Gibson | |
| 6,961,332 B1 | 11/2005 | Li et al. | |
| 6,963,633 B1 | 11/2005 | Diede et al. | |
| 6,965,614 B1 | 11/2005 | Osterhout et al. | |
| 6,985,961 B1 | 1/2006 | Ramsayer et al. | |
| 6,996,605 B2 | 2/2006 | Low et al. | |
| 7,020,130 B2 | 3/2006 | Krause et al. | |
| 7,031,700 B1 | 4/2006 | Weaver et al. | |
| 7,039,710 B2 | 5/2006 | Khartabil | |
| 7,050,559 B2 | 5/2006 | Silver et al. | |
| 7,082,193 B2 | 7/2006 | Barclay et al. | |
| 7,085,253 B2 | 8/2006 | Yang | |
| 7,123,707 B1 * | 10/2006 | Hiri et al. | 379/215.01 |
| 7,130,282 B2 | 10/2006 | Black | |
| 7,145,997 B2 | 12/2006 | Poikselka et al. | |
| 7,203,293 B1 | 4/2007 | Bedingfield | |
| 7,224,792 B2 | 5/2007 | Fusco | |
| 7,257,837 B2 | 8/2007 | Xu et al. | |
| 7,260,201 B2 | 8/2007 | Jorasch et al. | |
| 7,274,662 B1 | 9/2007 | Kalmanek et al. | |
| 7,283,517 B2 | 10/2007 | Yan et al. | |
| 7,290,288 B2 | 10/2007 | Gregg et al. | |
| 7,295,577 B2 | 11/2007 | Moody et al. | |
| 7,301,913 B2 | 11/2007 | Corrao et al. | |
| 7,406,696 B2 | 7/2008 | Burger et al. | |
| 7,426,265 B2 | 9/2008 | Chen et al. | |
| 7,440,440 B1 | 10/2008 | Abichandani et al. | |
| 7,460,657 B1 | 12/2008 | Baeza | |
| 7,489,771 B2 | 2/2009 | McMurry et al. | |
| 7,564,846 B2 | 7/2009 | Dezonno et al. | |
| 7,580,497 B2 | 8/2009 | Wang et al. | |
| 7,587,031 B1 | 9/2009 | Ress et al. | |
| 7,593,389 B2 | 9/2009 | Vance | |
| 7,599,355 B2 | 10/2009 | Sunstrum | |
| 7,602,901 B1 | 10/2009 | Kates et al. | |
| 7,609,700 B1 | 10/2009 | Ying et al. | |
| 7,609,706 B2 | 10/2009 | Scott et al. | |
| 7,630,481 B2 | 12/2009 | Kafka | |
| 7,711,810 B2 | 5/2010 | McKinnon et al. | |
| 7,715,413 B2 | 5/2010 | Vaziri et al. | |
| 7,743,141 B2 | 6/2010 | Wang et al. | |
| 7,751,536 B1 | 7/2010 | Abramson et al. | |
| 7,773,581 B2 | 8/2010 | Punj et al. | |
| 7,813,490 B2 | 10/2010 | DeMent et al. | |
| 7,849,205 B2 | 12/2010 | Pounds et al. | |
| 7,860,089 B2 | 12/2010 | Tripathi et al. | |
| 8,036,360 B1 | 10/2011 | Gogineni et al. | |
| 8,059,805 B2 | 11/2011 | Claudatos et al. | |
| 8,116,302 B1 | 2/2012 | Robbins | |
| 8,379,824 B2 | 2/2013 | Jackson et al. | |
| 2002/0038388 A1 | 3/2002 | Netter | |
| 2002/0075305 A1 | 6/2002 | Beaton et al. | |
| 2002/0114318 A1 | 8/2002 | Rines | |
| 2002/0131447 A1 | 9/2002 | Krishnamurthy et al. | |
| 2002/0136359 A1 | 9/2002 | Stumer et al. | |
| 2002/0136363 A1 | 9/2002 | Stumer et al. | |
| 2002/0137495 A1 | 9/2002 | Gabrysch | |
| 2002/0141548 A1 | 10/2002 | Boda | |
| 2002/0156900 A1 | 10/2002 | Marquette et al. | |
| 2003/0007483 A1 | 1/2003 | Um | |
| 2003/0028806 A1 | 2/2003 | Govindarajan et al. | |
| 2003/0043992 A1 | 3/2003 | Wengrovitz | |
| 2003/0088421 A1 | 5/2003 | Maes et al. | |
| 2003/0231759 A1 | 12/2003 | Bedingfield, Sr. et al. | |
| 2004/0004942 A1 | 1/2004 | Nebiker et al. | |
| 2004/0030750 A1 | 2/2004 | Moore et al. | |
| 2004/0037403 A1 | 2/2004 | Koch | |
| 2004/0051900 A1 | 3/2004 | Sagiya et al. | |
| 2004/0082324 A1 | 4/2004 | Ayoub | |
| 2004/0090954 A1 | 5/2004 | Zhang et al. | |
| 2004/0148395 A1 | 7/2004 | Schulzrinne | |
| 2004/0174983 A1 | 9/2004 | Olschwang et al. | |
| 2004/0207724 A1 | 10/2004 | Crouch et al. | |
| 2004/0240650 A1 * | 12/2004 | Bear et al. | 379/142.01 |
| 2004/0240656 A1 | 12/2004 | Poustchi | |
| 2004/0243680 A1 | 12/2004 | Mayer | |
| 2004/0249951 A1 * | 12/2004 | Grabelsky et al. | 709/227 |
| 2004/0264406 A1 | 12/2004 | Pattenden et al. | |
| 2005/0013421 A1 | 1/2005 | Chavez et al. | |
| 2005/0043014 A1 | 2/2005 | Hodge | |
| 2005/0069104 A1 | 3/2005 | Hanson et al. | |
| 2005/0078642 A1 | 4/2005 | Mayer et al. | |
| 2005/0123104 A1 | 6/2005 | Bishop et al. | |
| 2005/0129219 A1 | 6/2005 | Williamson | |
| 2005/0147227 A1 | 7/2005 | Chervirala et al. | |
| 2005/0190721 A1 | 9/2005 | Pershan | |
| 2005/0193338 A1 | 9/2005 | Hawkins et al. | |
| 2005/0195802 A1 | 9/2005 | Klein et al. | |
| 2005/0201530 A1 | 9/2005 | Koch et al. | |
| 2005/0213716 A1 | 9/2005 | Zhu et al. | |
| 2005/0215243 A1 | 9/2005 | Black et al. | |
| 2005/0226217 A1 | 10/2005 | Logemann et al. | |
| 2005/0237978 A1 | 10/2005 | Segal | |
| 2005/0249196 A1 | 11/2005 | Ansari et al. | |
| 2005/0286466 A1 | 12/2005 | Tagg et al. | |
| 2006/0023658 A1 | 2/2006 | Phillips et al. | |
| 2006/0033809 A1 | 2/2006 | Farley | |
| 2006/0039389 A1 | 2/2006 | Burger et al. | |
| 2006/0050648 A1 | 3/2006 | Eydelman | |
| 2006/0050682 A1 | 3/2006 | Vance | |
| 2006/0062210 A1 | 3/2006 | Dharanikota | |
| 2006/0062251 A1 | 3/2006 | Lim et al. | |
| 2006/0067300 A1 | 3/2006 | Poustchi et al. | |
| 2006/0067504 A1 | 3/2006 | Goldman et al. | |
| 2006/0140379 A1 | 6/2006 | Yamamoto et al. | |
| 2006/0140380 A1 * | 6/2006 | Croak et al. | 379/215.01 |
| 2006/0146737 A1 | 7/2006 | Ohrstrom Sandgren et al. | |
| 2006/0153342 A1 | 7/2006 | Sasaki | |
| 2006/0165060 A1 | 7/2006 | Dua | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1 | 9/2006 | Gibson | |
| 2006/0218283 A1 | 9/2006 | Jones et al. | |
| 2006/0221176 A1 | 10/2006 | Di Pietro et al. | |
| 2006/0251229 A1 | 11/2006 | Gorti et al. | |
| 2006/0285533 A1 | 12/2006 | Divine et al. | |
| 2006/0286984 A1 | 12/2006 | Bonner | |

(56) References Cited

U.S. PATENT DOCUMENTS

| | | |
|---|---|---|
| 2007/0025270 A1 | 2/2007 | Sylvain |
| 2007/0058613 A1 | 3/2007 | Beckemeyer |
| 2007/0058637 A1* | 3/2007 | Lo .............................. 370/395.2 |
| 2007/0083658 A1 | 4/2007 | Hanna et al. |
| 2007/0092073 A1 | 4/2007 | Olshansky et al. |
| 2007/0111723 A1 | 5/2007 | Ahmed et al. |
| 2007/0127660 A1* | 6/2007 | Roberts et al. ................ 379/161 |
| 2007/0143858 A1 | 6/2007 | Hearty |
| 2007/0147601 A1 | 6/2007 | Tischer et al. |
| 2007/0280469 A1 | 12/2007 | Baker et al. |
| 2008/0049724 A1 | 2/2008 | Tsujino et al. |
| 2008/0126549 A1 | 5/2008 | Khanchandani et al. |

OTHER PUBLICATIONS

"Cisco CallManager Features and Services Guide, Release 4.1(3)—Multilevel Precedence and Preemption," Cisco Systems, Inc., http://www.cisco.com/en/US/products/sw/voicesw/ps556/products_administration_guide . . . , three pages, Copyright 2005.

"IP Office, Do Not Disturb," Carroll Communications, Inc., www.carrollcommunications.com/ipoffice/5donotdisturb.html, one page, Copyright 2008.

"LSSGR Guide, (A Module of LSSGR, FR-64)," Telcordia Technologies Special Report, SR-3065, Issue 7, 114 pages, Aug. 2003.

"Newton's Telecom Dictionary, 22nd Edition," CMP Books, three pages, Feb. 2006.

"SPCS Capabilities and Features, A Module of LSSGR, FR-64," Telcordia Technologies Special Report, SR-504, Issue 1, 212 pages, Mar. 1996.

Handley, et al., "SDP: Session Description Protocol, RFC 2327," Network Working Group, The Internet Society, 43 pages, Apr. 1998.

Harrington, et al., "An Architecture for Describing Simple Network Management Protocol (SNMP) Management Frameworks, RFC 3411," Network Working Group, The Internet Society, pp. 1-64, Dec. 2002.

Jennings, et al., "Private Extensions to the Session Initiation Protocol (SIP) for Asserted Identity within Trusted Networks, RFC 3325," Network Working Group, The Internet Society, pp. 1-18, Nov. 2002.

Johnston, et al., "Session Initiation Protocol Call Control, Conferencing for User Agents, draft-ietf-sipping-cc-conferencing-04," SIPPING Working Group, The Internet Society, pp. 1-39, Jul. 18, 2004.

Lingle, et al., "Management Information Base for Session Initiation Protocol (SIP), draft-ietf-sip-mib-08.txt," SIPPING Working Group, The Internet Society, 102 pages, Jul. 16, 2004.

Mahy, et al., "A Call Control and Multi-Party Usage Framework for the Session Initiation Protocol (SIP), draft-ietf-sipping-cc-framework-03.txt." SIPPING Working Group, The Internet Society, pp. 1-43. Oct. 27, 2003.

Mahy, "A Message Summary and Message Waiting Indication Event Package for the Session Initiation Protocol (SIP), RFC 3842," Cisco Systems, Inc., Network Working Group, The Internet Society, pp. 1-19, Aug. 2004.

Mahy, et al., "The Session Initiation Protocol (SIP) 'Join' Header, draft-ietf-sip-join-03.txt.," SIPPING Working Group, The Internet Society, pp. 1-20, Feb. 2004.

Mahy et al, "The Session Initiation Protocol (SIP) 'Join' Header, RFC 3911," Network Working Group, The Internet Society, pp. 1-17, Oct. 2004.

Many, et al., "The Session Initiation Protocol (SIP) 'Replaces' Header, draft-ietf-sip-replaces-05.txt.," SIPPING Working Group, The Internet Society, pp. 1-19, Feb. 16, 2004.

Mahy, et al., "The Session Initiation Protocol (SIP) 'Replaces' Header, RFC 3891," Network Working Group, The Internet Society, pp. 1-16, Sep. 2004.

Petrie, "A Framework for Session Initiation Protocol User Agent Profile Delivery, draft-letf-sipping-config-framework-04.txt," Pingtei Corp., SIPPING Working Group, The Internet Society, 34 pages, Jul. 19, 2004.

Rosenberg, et al., "A Session Initiation Protocol (SIP) Event Package for Conference State, draft-ietf-sipping-conference-package-04," SIPPING Working Group, The Internet Society, 29 pages, May 21, 2004.

Rosenberg, et al., "An INVITE Initiated Dialog Event Package for the Session Initiation Protocol (SIP), draft-ietf-sipping-dialog-package-04.txt," SIPPING Working Group, The Internet Society, pp. 1-35, Feb. 13, 2004.

Rosenberg, et al., "Indicating User Agent Capabilities in the Session Initiation Protocol (SIP), RFC 3840," Network Working Group, The Internet Society, pp. 1-35, Aug. 2004.

Rosenberg, et al., "Reliability of Provisional Responses in the Session Initiation Protocol (SIP), RFC 3262," Network Working Group, The Internet Society, pp. 1-14, Jun. 2002.

Rosenberg, et al., "SIP: Session initiation Protocol—RFC 3261," Network Working Group, The Internet Society, 269 pages, Jun. 2002.

Rosenberg, "The Session Initiation Protocol (SIP) Update Method, RFC 3311," Dynamicsoft Inc., Network Working Group, The Internet Society, pp. 1-13, Sep. 2002.

Schulzrinne, "Emergency Services URI for the Session Initiation Protocol, draft-ietf-sipping-sos-00," Columbia University, Network Working Group, The Internet Society, pp. 1-17, Feb. 8, 2004.

Schulzrinne, et al., "RTP Payload for DTMF Digits, Telephony Tones and Telephony Signals, RFC 2833," Network Working Group, The Internet Society, 31 page, May 2000.

Schulzrinne, et al., "RTP: A Transport Protocol for Real-Time Applications, RFC 1889," Network Working Group, The Internet Society, pp. 1-75, Jan. 1996.

Sparks, et al., "Session Initiation Protocol Call Control—Transfer, draft-ietf-sipping-cc-transfer-02," SIPPING Working Group, The Internet Society, pp. 1-37, Feb. 15, 2004.

Sparks, "The Session Initiation Protocol (SIP) Refer Method, RFC 3515," Dynamicsoft, Inc., Network Working Group, The Internet Society, pp. 1-23, Apr. 2003.

* cited by examiner

METHOD AND SYSTEM FOR PROVIDING CALL WAITING FEATURES IN A SIP-BASED NETWORK

CROSS-REFERENCE TO RELATED APPLICATIONS

This patent application is a continuation of and claims priority to U.S. patent application Ser. No. 11/534,426, filed Sep. 22, 2006 which claims priority to U.S. Provisional Patent Application No. 60/719,465, filed Sep. 22, 2005. The contents of these priority applications are hereby incorporated by reference herein in their entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides call waiting features over a SIP based network to a device such as an analog based device. An embodiment of the present invention may support a call waiting "deluxe" service which allows a called party to respond to an incoming call request by providing one or more user actions. User actions by way of non-limiting example may include answering a call request, forwarding a call request, transferring a call request to an announcement server, dropping a call request, putting a call request on hold, transferring a call request to a voice mail server, putting a call request in conference with an existing call and/or other user actions.

Figure 1:
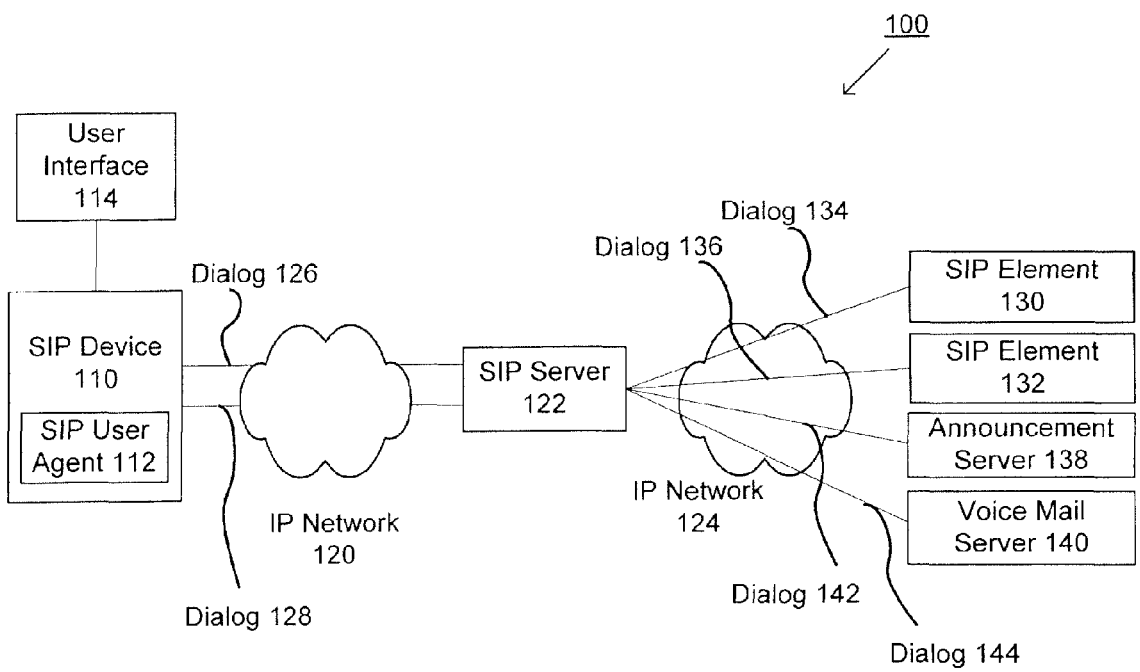
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular a call waiting "deluxe" service. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP Element 132, through IP Network 124. Announcement Server 138 may allow calls to be directed to announcements. Voice Mail Server 140 may allow calls to be directed to voice mail. Dialogs 126, 128, 134, 136, 142 and 144 may provide connectivity between one or more SIP elements and a server. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voiceband or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. A SIP element may be a SIP Device, SIP Server, and/or other SIP enabled device. In addition, a SIP element may also represent a PSTN device that may be reached by a gateway that, directly or indirectly, acts as a SIP User Agent.

As shown in FIG. 1, multiple dialogs may be established between a SIP element and a network element. According to an exemplary application, Dialogs 126, 128, 134, 136, 142 and 144 may provide connectivity between one or more SIP elements and a network element. For example, one dialog may be used to connect a SIP element to a SIP server and maintain an active call between a SIP server acting as a back to back user agent (B2BUA) and a second SIP element across an IP network or other network. SIP elements may be connected to user interfaces providing audio connectivity between two or more users thereby permitting a call. According to one embodiment of the present invention, a server may provide connectivity between two or more users by managing these dialogs, which may be in response to a user selection. For example, if a user selects "answer," a SIP server may connect two dialogs by interconnecting the two media streams of the dialogs and permitting the transmission of audio between two or more users. By way of non-limiting example, a first user at user interface 114 may engage in an active call with a second user connected to SIP element 130. This conversation may be established by SIP server 122 interconnecting the media streams of dialog 126 with dialog 134.

A user connected to SIP Element 132 may call the first user by sending a SIP INVITE request to SIP Server 122. SIP Server 122 may send the INVITE request to SIP Device 110. According to one embodiment, Dialog 128 may be established. SIP Device 110 may indicate to the user at User Interface 114 that it has received an INVITE request. The user at User Interface 114 may perform an action to answer the INVITE request. This action may place existing Dialog 126 on hold and activate Dialog 128, enabling the user to send a dual tone multi frequency (DTMF) signal to SIP Server 122 on Dialog 128. By way of non-limiting example, the user action may be a "hookswitch flash." SIP Server 122 may wait to receive a user response to the SIP INVITE request. For example, SIP Server 122 may set a timer which may execute a specified default action upon expiration. A user response may be a DTMF signal which may correspond to a user selection. By way of non-limiting example, a user response transmitted by SIP Device 110 may include a DTMF signal corresponding to a user response of "answer" or other action. As a result, SIP Server 122 may allow User Interface 114 to answer a call request from SIP Element 132 when currently engaged in an active call with SIP Element 130. SIP Server 122 may then interconnect the media streams of Dialog 128 and Dialog 134 permitting the exchange of audio or other data between the first user and the third user.

In other examples, SIP Server 122 may manage the dialogs between a first user and one or more other users in response to an expiration of a timer set by SIP Server 122 or other element. For example, the timer may be set after sending a call request to a first user. For example, the timer may be set after SIP Server 122 detects that Dialog 126 or Dialog 128 has been activated (taken "off hold") by SIP Device 110. In some examples, the timer may be a predetermined response time or may be based on a condition. According to an embodiment of the present invention, a server may manage dialogs between a first user and one or more other users upon expiration of a timer by executing a default action. By way of non-limiting example, actions available to a user for the management of call dialogs may include one or more of the following: answer, forward, announcement, drop, hold, conference and/or other action. For example, one or more user responses may be available to a first user when the first user is engaged in an active call and a second call request is received by the first user. By way of non-limiting example, additional actions available to a user for the management of call dialogs may also include return, drop, conference and/or other action.

These user responses may be available to a first user when a user is engaged in one active call and has a second answered call on hold. By way of non-limiting example, further actions available to a user for the management of call dialogs may include "drop first choice," "drop last choice," etc. These choices may be available, for example, when a first user is engaged in a conference call with two or more additional users.

In some exemplary embodiments of the present invention, User Interface 114 may be an Analog Display Services Interface (ADSI) compatible telephone, which may provide a display and may provide additional function buttons. The additional function buttons may be mapped to correspond to user actions which may send hookswitch flashes, a DTMF signal and/or other action. In some embodiments, a user action may be indicated by a hookswitch flash alone. In other examples, the embodiment of the present invention may be combined with other functionality such as caller identification and/or talking call waiting which may provide an indication of the identity of a caller. In such examples, a user may use the calling party's identity to determine the disposition of an incoming call request.

Announcement Server 138 may allow calls to be directed to announcements. For example, an announcement server may provide recorded announcements. In addition, Announcement Server 138 may be connected to SIP Server 122 over an IP network. Announcement Server 138 may play a specified announcement to a call directed to the announcement server. In an exemplary embodiment of the present invention, Announcement Server may provide a customized announcement based on the identity of the intended call recipient or other attribute. For example, an announcement may be customized to contain an intended call recipient's name. In other embodiments, an announcement may be synthesized based on a call information such as the identification or geographic origin of the call.

Voice Mail Server 140 may allow calls to be directed to voice mail. Voice Mail Server 140 may be accessible to SIP Server 122 over an IP network. For example, a call request may be redirected from SIP Device 110 to Voice Mail Server 140 by SIP Server 122. SIP Server 122 may redirect the call request in response to a user specified action, in response to the expiration of a timer or other response. Voice Mail Server 140 may provide voice mail functionality to one or more users.

According to some embodiments of the present invention, various combinations of a SIP server, an announcement server and a voice mail server may be implemented.

Figure 2:
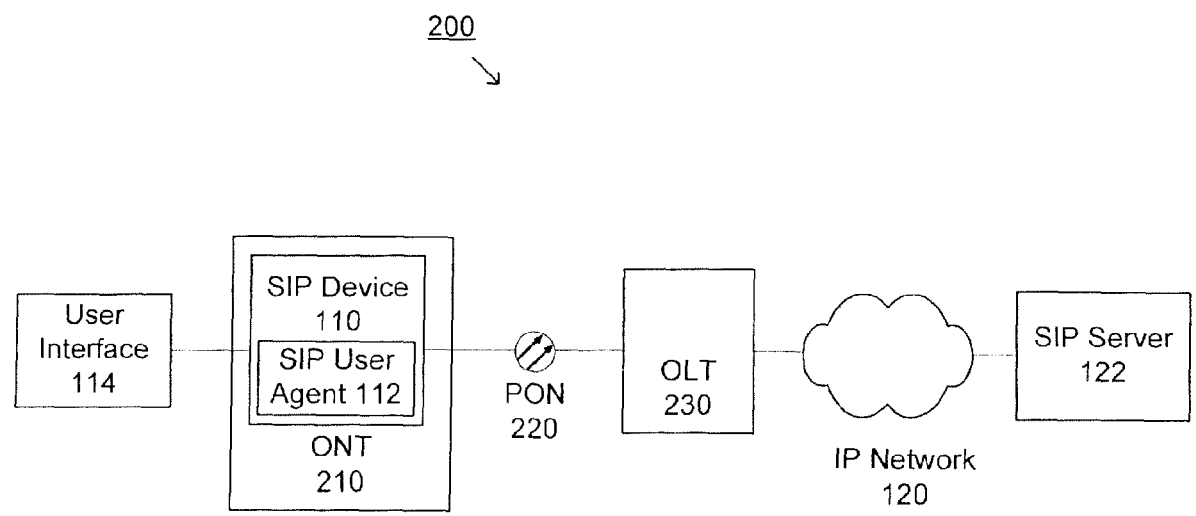
FIG. 2 illustrates an exemplary implementation where a SIP Device is embedded in a FTTP network, according to an embodiment of the present invention.
Figure 3:
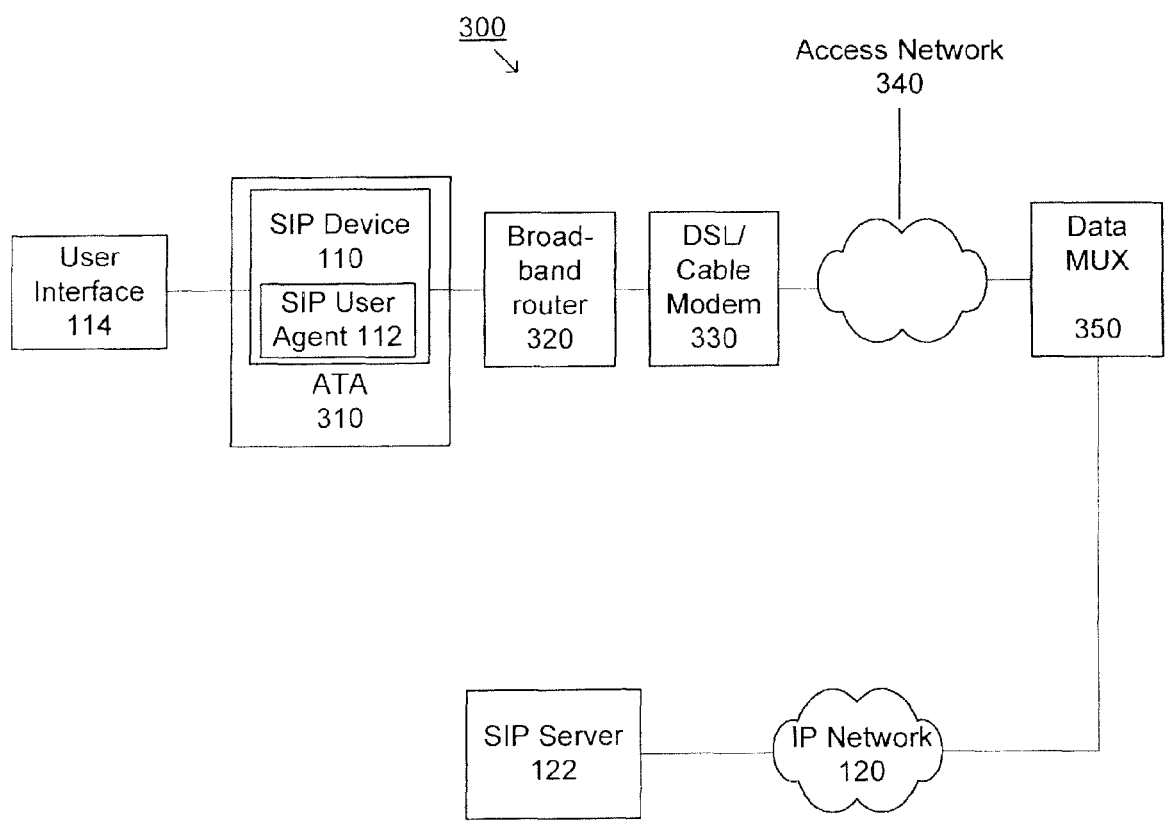
FIG. 3 illustrates an exemplary implementation where a SIP Device is embedded in an ATA device attached to a network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications. By way of non-limiting example a user of User Interface 114 who is currently engaged in an active call with a user of SIP Element 130, may receive a second call request from a user of SIP Element 132. The user of User Interface 114 may select a user action signifying forwarding the second call request to Voice Mail Server 140.

Figure 4:
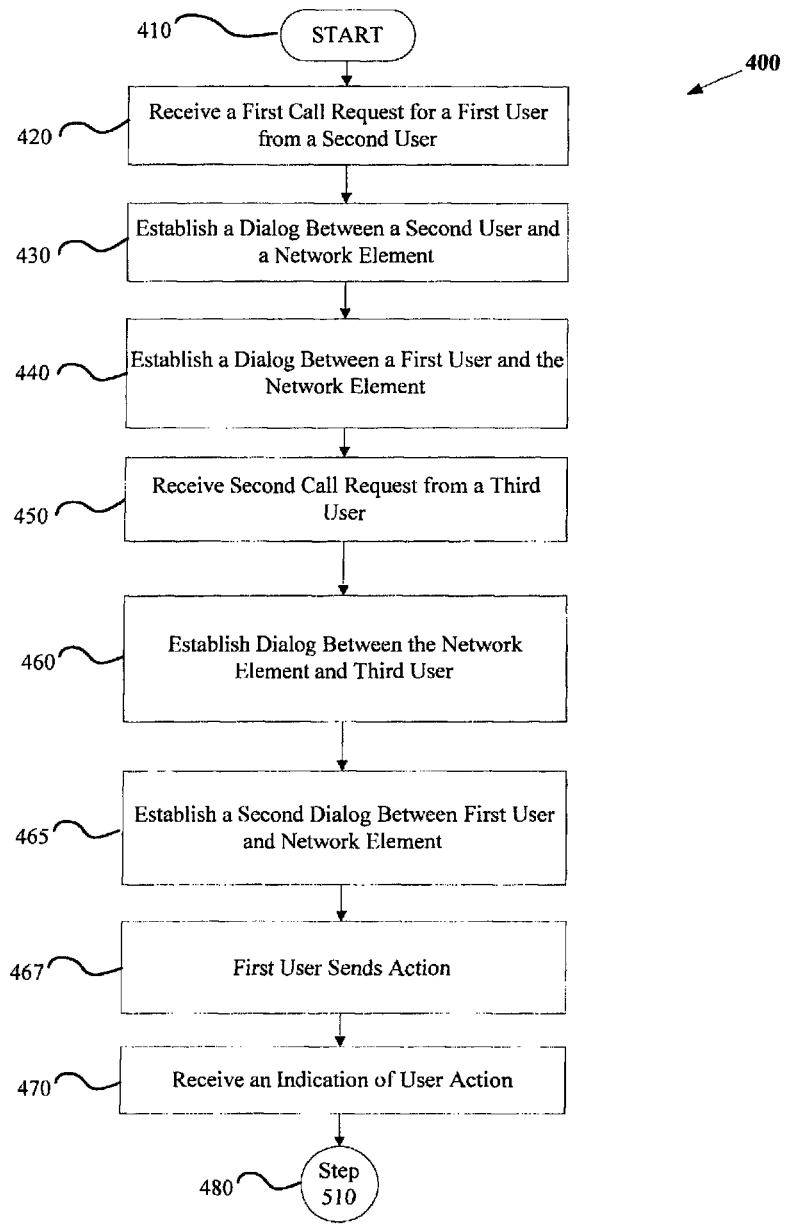
FIG. 4 is a flowchart depicting a method of providing user actions in response to a call request, according to an embodiment of the present invention.

FIG. 4 is a flowchart depicting a method for providing user actions in response to a call request, according to an embodiment of the present invention. According to one or more embodiments, flow chart 400 may begin at step 410.

At step 420, a first call request for a first user may be received from a second user. According to some examples, a call request may be received at a network element. In one or more embodiments, a call request may be received at SIP Server 122 associated with the first user, and may be in the form of a SIP INVITE message from SIP Element 130 associated with the second user.

At step 430, a dialog may be established between a second user and a network element. By way of non-limiting example, Dialog 134 may be established between SIP Element 130 and SIP Server 122.

At step 440, a dialog may be established between the first user and a network element. By way of non-limiting example, Dialog 126 may be established between SIP Device 110 associated with the first user and SIP Server 122. According to an embodiment of the present invention, dialogs may be interconnected permitting the transmission of audio signals. In one or more embodiments, a SIP server may permit conversation, the transmission of audio signals and/or other data between a caller and a call recipient by interconnecting the dialog of a call recipient and a SIP server with the dialog of a caller and a SIP server. In such embodiments a SIP server may act as a back to back user agent (B2BUA).

At step 450, a second call request to the first user may be received from a third user. According to some examples, a network element may receive a second call request. In one or more embodiments, a call request may be a SIP INVITE from SIP Element 132 associated with the third user which may be received at SIP Server 122.

At step 460, a dialog may be established between a network element and the third user. By way of non-limiting example, Dialog 136 may be established between SIP Server 122 and SIP Element 132.

At step 465, a second dialog may be established between the first user and a network element. By way of non-limited example, Dialog 128 may be established between SIP Device 110 and SIP Server 122. The first user may be alerted to the establishment of the second dialog, for example, by SIP Device 110 providing a device-compatible alert signal to User Interface 114. For example, SIP Device 110 may provide an alert tone or other alert message to User Interface 114.

At step 467, the first user may take an action in response to the second dialog. For example, the first user may take an action that causes the first dialog between the first user and a network element to be placed on hold and the second dialog between the first user and a network element to become active. For example, the user at SIP Device 110 may place the existing Dialog 126 on hold and activate the new Dialog 128. Alternatively, the first user may take no action in response to the second dialog. A network element may wait to receive a user action on the second dialog, for example, by establishing a timer, and may interpret a timeout with no indication of user action being received as a default user action. In the described embodiment, SIP Server 122 may establish a timer for a response from SIP Device 110, and interpret a failure to receive an action indication as a selection of the default action by the first user.

In embodiments where an analog user interface (e.g., analog telephone) is being used in conjunction with SIP Device 110, user action may take a form consistent with the capabilities of such user interfaces. For example, the user may perform a "hookswitch flash" to signal a hold of the active call and a switch to the new call. Likewise, the user may depress keypad keys of User Interface 114 to generate DTMF tones indicating selection of actions. Such actions may be interpreted by SIP Device 110 and SIP User Agent 112 as selection of a call waiting deluxe call disposition option. SIP User Agent 112 may then formulate a SIP message that includes an indication of the action selection by the first user. For example, SIP User Agent 112 may generate a message that includes indications of the DTMF tones generated by User Interface 114 immediately after receiving the hookswitch flash, and send such message to SIP Server 112 as part of Dialog 128.

At step 470, an indication of a user action may be received. For example, an indication of a user action may be received at a network element in response to the second call request. According to an embodiment of the present invention, the indication of a user action may indicate a disposition option of the second call request, according to the disposition options that may be available as part of the call waiting deluxe service. In some embodiments, the indication of the user action may include indications of one or more DTMF tones generated by the user interface while the second dialog is active.

Figure 5:
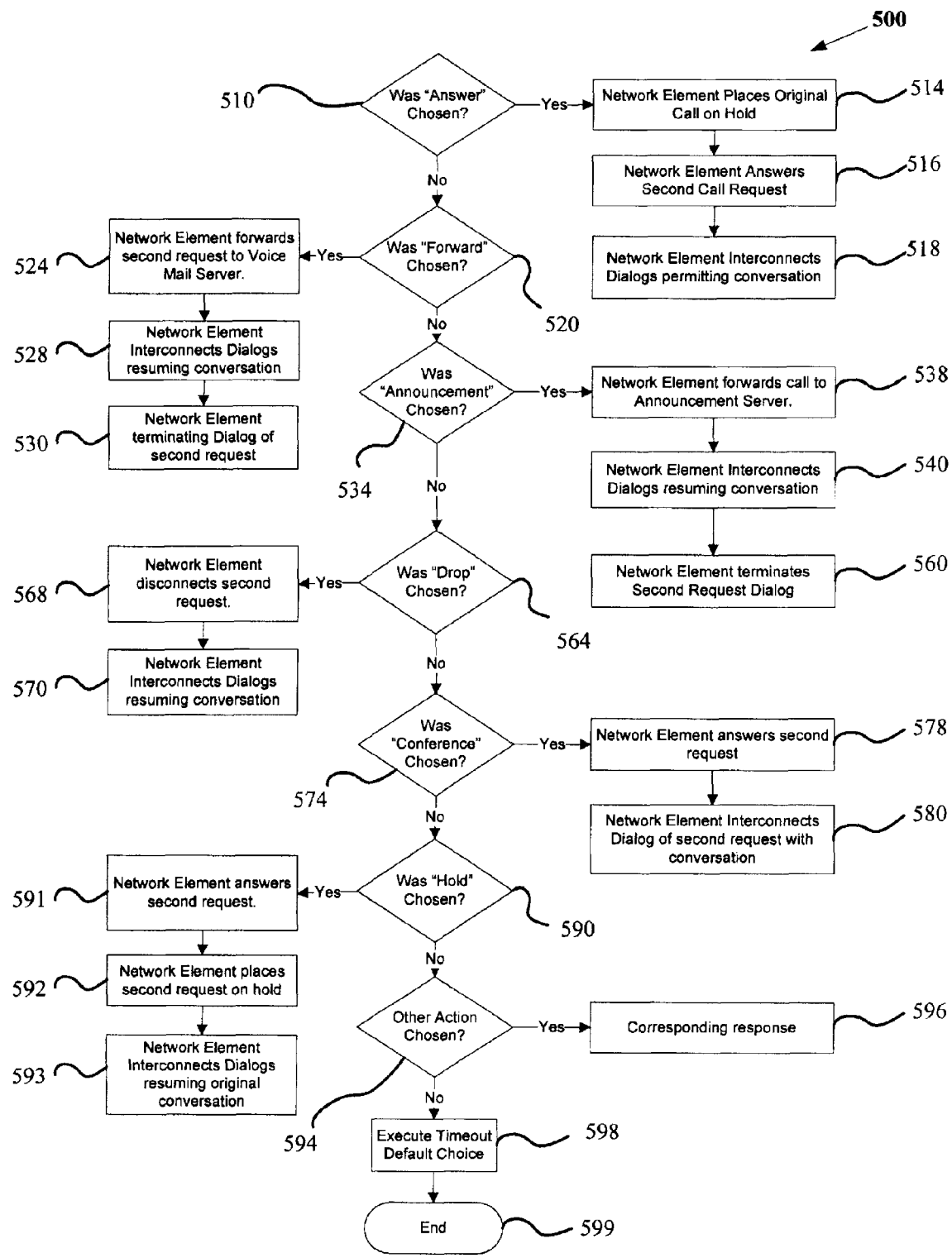
FIG. 5 is a flowchart depicting a method of providing user actions for disposition of a second call when currently engaged in an active call, according to an embodiment of the present invention.

At step 480, the process may continue at step 510 of FIG. 5.

FIG. 5 is a flowchart depicting a method of providing user actions for disposition of a second call to a first user from a third user when a first user is currently engaged in an active call with a second user, according to an embodiment of the present invention. As shown, several options are available to the first user which may include "Answer", "Forward", "Announcement", "Drop", "Hold" and/or other action.

In some embodiments a response from the first user may be received at a network element. For example, a SIP server may receive a user response of an indication of a DTMF signal from a SIP device, which the network element may map to certain available options for call disposition. At decision box 510, if a user response signifying "Answer" is received, the flow may proceed to step 514. If a user response signifying "Answer" is not received, the flow may proceed to step 520. At step 514, a network element may place the original dialog with the second user on hold. At step 516, a network element may affirmatively answer the second call request. At step 518, a network element may interconnect the dialogs of a call recipient and a third party permitting the transmission of audio signals between the two parties. By way of non-limiting example of the illustrated embodiment, SIP Server 122 may place Dialog 134 on hold and may interconnect Dialogs 136 and 128, thus allowing for communication between the first user and third user to occur.

At decision box 520, if a user response signifying "Forward" is received, the flow may proceed to step 524. At step 524, a network element may forward the second call request. For example, a network element may forward the second call request to a voice mail server. In other embodiments, a network element may forward a second call request to a specified destination (possibly preset by the first user). At step 528, if the network element previously disconnected the dialogs of the first user and second user pending disposition of the second call request, the network element may interconnect the dialogs of the first user and the network element and the second user and the network element which may resume their communications. At step 530, the network element may terminate the dialog between the first user and the network element established as part of the second call request. In the illustrated embodiment, a receipt of an indication from SIP Device 110 that maps to the "Forward" action may cause SIP Server 122 to forward the call from the third user to Voice Mail Server 140, and terminate the Dialog 136.

If a user response signifying "Forward" is not received, the flow may proceed to decision box 534. At decision box 534, if a user response signifying "Announcement" is received, the flow may proceed to step 538. At step 538, a network element may forward the second call to an announcement server. According to some examples, a caller forwarded to an announcement server may hear a recorded announcement. According to other examples, a caller forwarded to an announcement server may hear a personalized announcement. At step 540, if the network element previously disconnected the dialogs of the first user and second user pending disposition of the second call request, the network element may interconnect the dialogs of the first user and the network element and the second user and the network element, which may resume their communications. At step 560, the network element may terminate the dialog between the first user and the network element established as part of the second call request. In the illustrated embodiment, a receipt of an indication from SIP Device 110 that maps to the "Announcement" action may cause SIP Server 122 to forward the call from the third user to Announcement Server 138, and terminate the Dialog 128.

If a user response signifying "Announcement" is not received, the flow may proceed to decision box 564. At decision box 564, if a user response signifying "Drop" is received, the flow may proceed to step 568. At step 568, a network element may terminate the dialog between the first user and the network element established as part of the second call request, and terminate the dialog between the third user and the network element also established as part of the second call request. According to some examples, at step 570 the network element may maintain (or reconnect, if they were disconnected) the dialogs permitting communication between the first user and the second user. In the illustrated embodiment, a receipt of an indication from SIP Device 110 that maps to the "Drop" action may cause SIP Server 122 to terminate Dialog 136 and Dialog 128.

If a user response signifying "Drop" is not received, the flow may proceed to decision box 574. At decision box 574, if a user response signifying "Conference" is received, the flow may proceed to step 578. At step 578, a network element may affirmatively answer the second call request. At step 580, a network element may interconnect the dialogs of the original communications between the first user and second user with the dialog established with the third user as part of the second call request, thus permitting the transmission of communications between the first user and the second and third users. In the illustrated embodiment, a receipt of an indication from SIP Device 110 that maps to the "Conference" action may cause SIP Server 122 to interconnect Dialog 136 with Dialog 126 and Dialog 134.

If a user response signifying "Conference" is not received, the flow may proceed to decision box 590. At decision box 590, if a user response signifying "Hold" is received, the flow may proceed to step 591. At step 591, a network element may affirmatively answer the second call request. At step 592, a network element may place the dialog between a third user and a network element established as part of the second call request on hold. At step 593, if the network element previously disconnected the dialogs of the first user and second user pending disposition of the second call request, the network element may interconnect the dialogs of the first user and the network element and the second user and the network element, which may resume their communication.

If a user response signifying "Hold" is not received, the flow may proceed to decision box 594. At decision box 594, if a user response signifying another action is received, the flow may proceed to step 596. At step 596, a network element may perform an action corresponding to the signal specified by a user response (or if no further actions are supported, may indicate an error condition).

If a user response signifying another action is not received, the flow may proceed to step 598. At step 598, if no user response is received, a timer set by a network element may expire and the network element may execute a default action. For example, the default action may be preset to forward the incoming call to a voice mail server.

At step 599, the process may end.

Figure 6:
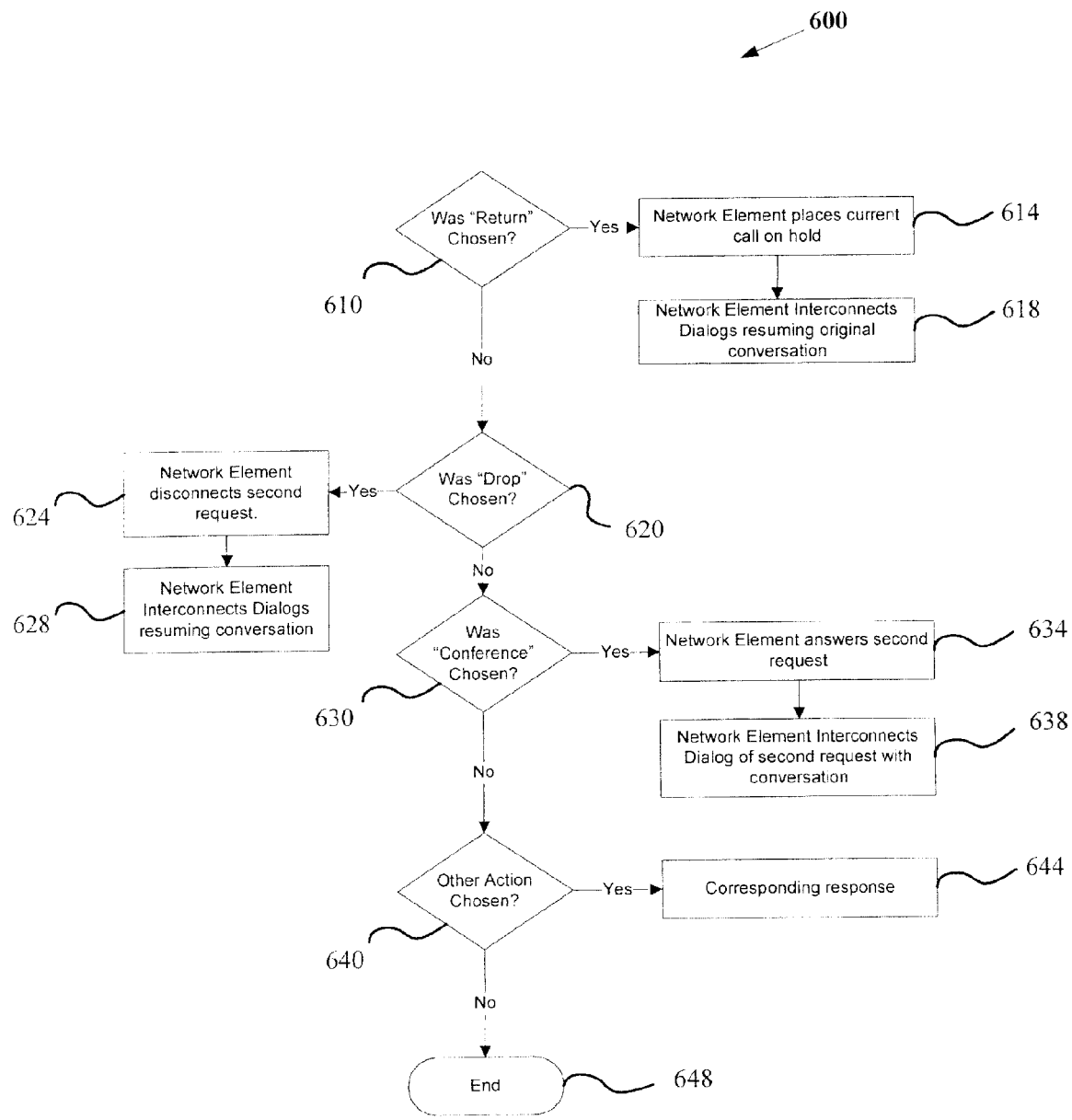
FIG. 6 is a flowchart depicting a method of providing user actions for managing two or more connected calls, according to an embodiment of the present invention.

FIG. 6 is a flowchart depicting a method of providing user actions for managing two or more connected calls, according to an embodiment of the present invention. For example, the options of FIG. 6 may be applied in an exemplary scenario where a first call is active and a second call connected to a same network element as the first call is on hold (e.g., as a result of an initial "Hold" action specified by the called party in response to the call request, such as described above). The steps of FIG. 6 may be applied to other scenarios.

At decision box 610, if a user response signifying "Return" is received, the flow may proceed to step 614. If a user response signifying "Return" is not received, the flow may proceed to decision box 620.

At step 614, a network element may place a current call on hold. At step 618, a network element may interconnect dialogs of a first user and the network element and a second user and the network element which may resume a conversation.

At decision box 620, if a user response signifying "Drop" is received, the flow may proceed to step 624. At step 624, a network element may disconnect a dialog of a second request. At step 628, a network element may interconnect dialogs of a first user and the network element and a second user and the network element which may resume a conversation.

If a user response signifying "Drop" is not received, the flow may proceed to decision box 630. At decision box 630, if a user response signifying "Conference" is received, the flow may proceed to step 634. At step 638, a network element may interconnect the dialogs of the original conversation and a second call request permitting the transmission of audio between a first user and two or more other users.

If a user response signifying "Conference" is not received, the flow may proceed to decision box 640. At decision box 640, if a user response signifying another action is received, the flow may proceed to step 644. If a user response signifying another action is not received, the flow may proceed to step 648. At step 644, a network element may perform an action corresponding to a signal specified by a user response.

At step 648, the process may end.

Figure 7:
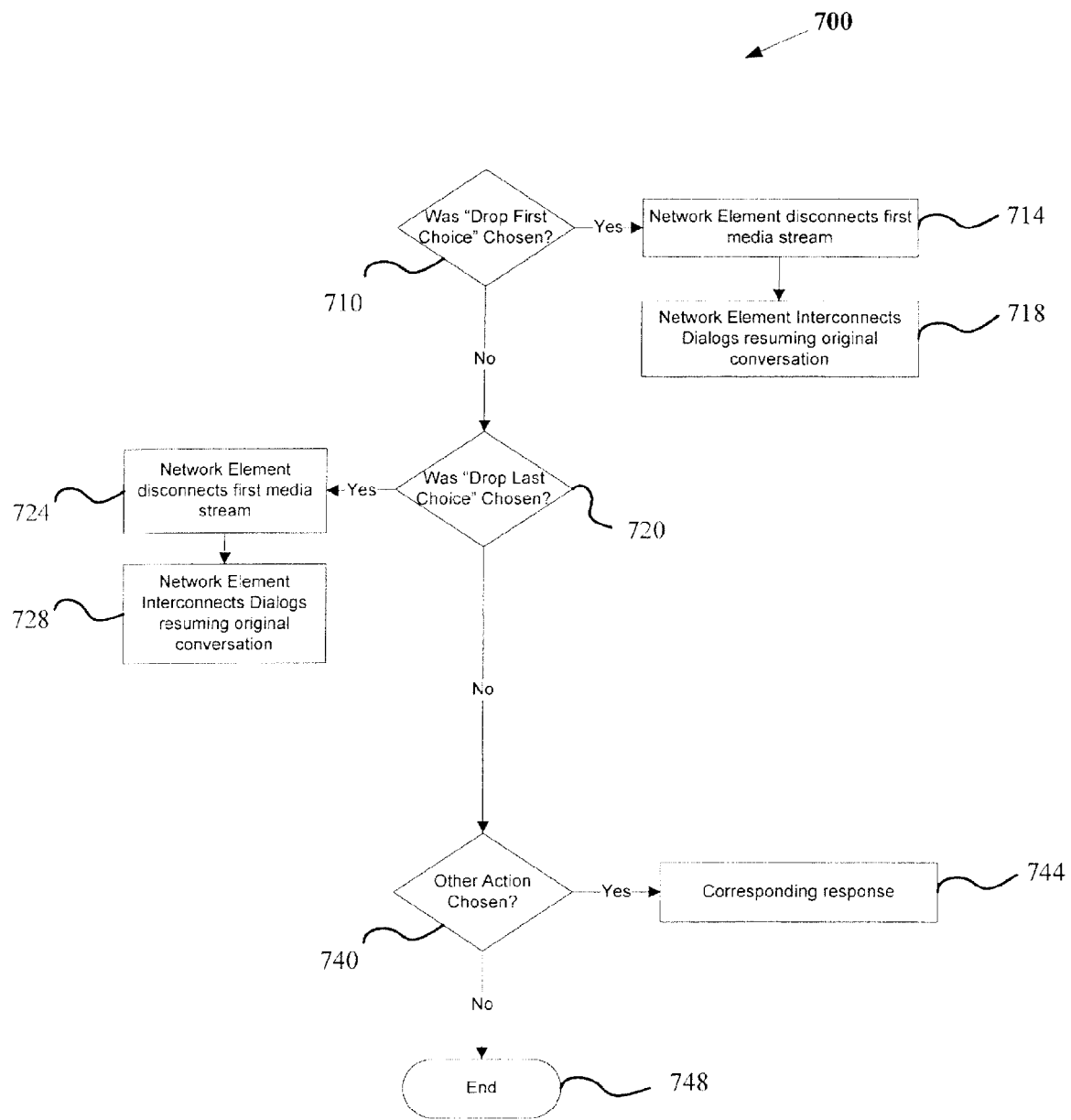
FIG. 7 is a flowchart depicting a method of providing user actions for managing two or more calls in a conference call, according to an embodiment of the present invention.

FIG. 7 is a flowchart depicting a method of providing user actions for managing two or more calls in a conference call, according to an embodiment of the present invention. The options of FIG. 7 may be applied during a conference call involving multiple users (e.g., as a result of a user specifying the "Conference" action in response to an initial call request, as described above).

At decision box 710, if a user response signifying "Drop First Choice" is received, the flow may proceed to step 714. At step 714, a network element may remove a dialog between a second user and a network element from a conference and may terminate that dialog. At step 718, a network element may interconnect dialogs of a first user and the network element and a third user and the network element which may resume a conversation.

If a user response signifying "Drop First Choice" is not received, the flow may proceed to decision box 720.

At decision box 720, if a user response signifying "Drop Last Choice" is received, the flow may proceed to step 724. At step 724, a network element may remove a dialog between a third user and a network element from a conference and may terminate that dialog. At step 728, a network element may interconnect dialogs of a first user and the network element and a second user and the network element which may resume a conversation. If a user response signifying "Drop Last Choice" is not received, the flow may proceed to decision box 740. At decision box 740, if a user response signifying another action is received, the flow may proceed to step 744. At step 744, a network element may perform an action corresponding to a signal specified by a user response.

If a user response signifying another action is not received, the flow may proceed to step 748.

At step 748, the process may end.

Figure 8:
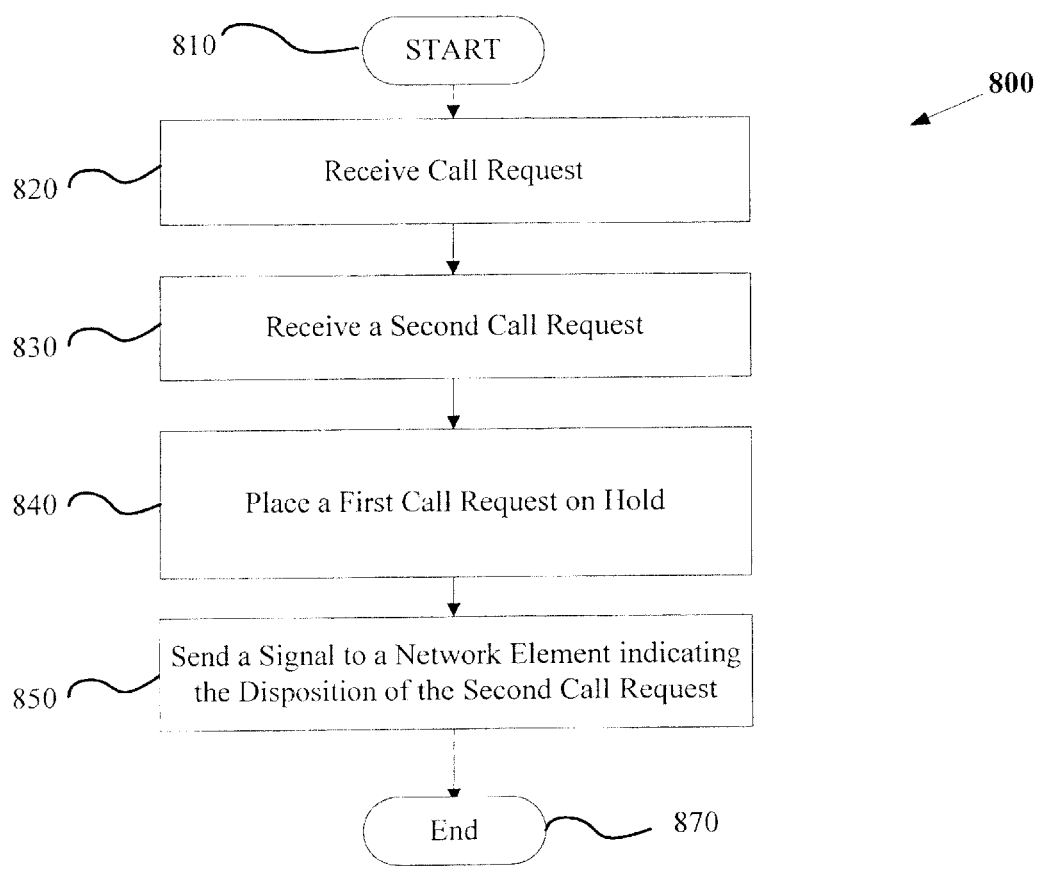
FIG. 8 is a flowchart depicting a method of managing one or more call requests received at a device, according to an embodiment of the present invention.

FIG. 8 is a flowchart depicting a method of managing one or more call requests received at a device, according to an embodiment of the present invention. According to some embodiments, the process may start at step 810.

At step 820, a call request may be received. According to some examples, a call request may be a SIP INVITE received by a SIP device. According to some embodiments, this may establish a dialog between a network element and a SIP Device. At step 830, a second call request may be received. At step 840, a user action may be performed that places the dialog established by the first call request on hold and answers the second call request, establishing a second dialog between a device and a network element. In some embodiments, the user action may be a hookswitch flash.

At step 850, the user may use the user interface to generate a signal corresponding to a disposition option for the call request, and the SIP device may send a message including an indication of the selection action to a network element indicating the disposition of a call request. In one or more examples, the signal generated by the user interface may be a DTMF signal corresponding to a user selection. Other user signals may be recognized. In some examples, the SIP device receiving such signals may interpret such signals and generate appropriate SIP messaging corresponding to such signals, thus enabling traditional analog devices connected to the SIP device to provide a user with one or more functions to handle incoming call requests. In some embodiments, steps 840 and 850 may be performed multiple times during the existence of the first and second dialogs. For example, upon receipt of the hookswitch flash, the SIP device may put the currently active dialog on hold, and activate the currently held dialog. The SIP device may then send any action selection indications received from the user interface to the network element as part of the newly activated dialog to effect the selected call disposition.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving, by a session initiation protocol (SIP) based network element, a first call request to establish a call between a first calling party device and a called party device;
establishing, by the SIP based network element, a first dialog between the SIP based network element and the called party device based on receiving the first call request;
establishing, by the SIP based network element, a second dialog between the SIP based network element and the first calling party device based on receiving the first call request;
receiving, by the SIP based network element, a second call request to establish a call between a second calling party device and the called party device;
establishing, by the SIP based network element, a third dialog between the SIP based network element and the second calling party device based on the second call request;
establishing, by the SIP based network element, a fourth dialog between the SIP based network element and the called party device based on the second call request;
alerting, by the SIP based network element, the called party device to the second call request;
waiting, by the SIP based network element, for a response from the called party device to the second call request;
performing a default action if the response is not received within a predetermined period of time; and
determining, by the SIP based network element and based on the response, an action, and managing a disposition of the second call request by performing the action if the response is received within the predetermined period of time, the response being received as a SIP message formulated based on a mapping between one or more SIP messages and a corresponding one or more analog input signals,
the mapping including:
  a first mapping between a first SIP message and a first analog input signal that indicates that the called party device is to answer the second call request if the response indicates to answer the second call request,
  a second mapping between a second SIP message and a second analog input signal that indicates that the second call request is to be forwarded to a destination device if the response indicates to forward the second call request,
  a third mapping between a third SIP message and a third analog input signal that indicates that the second call request is to be dropped if the response indicates to drop the second call request,
  a fourth mapping between a fourth SIP message and a fourth analog input signal that indicates that the called party device, the first calling party device, and the second calling party device are to be placed in a conference call if the response indicates to establish the conference call, and
  a fifth mapping between a fifth SIP message and a fifth analog input signal that indicates that the second call request is to be placed on hold if the response indicates to place the second call request on hold.

2. The method of claim 1, further comprising:
placing the first calling party device on hold and establishing an interconnection between the called party device and the second calling party device based on the first mapping.

3. The method of claim 1, further comprising:
forwarding the second call request to the destination device based on the second mapping.

4. The method of claim 1, wherein the destination device is a voice mail server that permits the second calling party device to record a voice mail message.

5. The method of claim 1, wherein the destination device is an announcement server that plays a recorded announcement to the second calling party device.

6. The method of claim 1, further comprising:
terminating the third dialog and the fourth dialog based on the third mapping.

7. The method of claim 1, further comprising:
establishing an interconnection between the first dialog, the second dialog, the third dialog, and fourth dialog such that the first calling party device, the called party device, and the second calling party device are placed in the conference call based on the fourth mapping.

8. The method of claim 1, further comprising:
answering, by the SIP based network element, the second call request;
placing the second call request in a hold status based on the fifth mapping; and
maintaining the first dialog and the second dialog between the first calling party device and the called party device.

9. The method of claim 1, wherein the SIP based network element comprises a SIP based server which acts as a back to back user agent for a SIP device associated with the called party device.

10. The method of claim 1, wherein the one or more analog input signals comprises one or more dual tone multi frequency (DTMF) tones.

11. A device, comprising:
one or more processors to:
  receive a first call request to establish a call between a first calling device and a called device;
  establish a first dialog between a session initiation protocol (SIP) based network element and the called device based on receiving the first call request;
  establish a second dialog between the SIP based network element and the first calling device based on receiving the first call request;
  receive a second call request to establish a call between a second calling device and the called device;
  establish a third dialog between the SIP based network element and the second calling device based on the second call request;
  establish a fourth dialog between the SIP based network element and the called device based on the second call request;
  alert the called device to the second call request via the fourth dialog;
  wait for a response from the called device via the fourth dialog based on alerting the called device;
  perform a default action if the response is not received within a predetermined period of time; and
  identify an indication of an action, included in the response from the called device, and manage a disposition of the second call request by performing the action if the response is received within the predetermined period of time,
    the indication of the action being received as a SIP message formulated based on a mapping between a set of SIP messages and a corresponding set of analog input signals,
    the mapping including:
      a first mapping, between a first SIP message and a first analog input signal that indicates that the called device is to answer the second call request, when the indication of the action indicates to answer the second call request,
      a second mapping, between a second SIP message and a second analog input signal that indicates that the second call request is to be forwarded to a destination device, when the indication of the action indicates to a forward the second call request,
      a third mapping, between a third SIP message and a third analog input signal that indicates that the second call request is to be dropped, when the indication of the action indicates to drop the second call request,
      a fourth mapping, between a fourth SIP message and a fourth analog input signal that indicates that the called device, the first calling device, and the second calling device are to be placed in a conference call, when the indication of the action indicates to place the second call request in the conference call, and
      a fifth mapping, between a fifth SIP message and a fifth analog input signal that indicates that the second call request is to be placed on hold, when the indication of the action indicates to place the second call request on hold.

12. The device of claim 11, where the one or more processors are further to:
place the first calling device on hold and establish an interconnection between the called device and the second calling device based on the first mapping.

13. The device of claim 11, where the one or more processors are further to:
   forward the second call request to the destination device based on the second mapping.

14. The device of claim 11, wherein the destination device comprises a voice mail server.

15. The device of claim 11, wherein the destination device comprises an announcement server that plays a recorded announcement.

16. The device of claim 11, where the one or more processors are further to:
   terminate the third dialog and the fourth dialog based on the third mapping.

17. The device of claim 11, where the one or more processors are further to:
   establish an interconnection between the first dialog, the second dialog, the third dialog, and the fourth dialog such that the first calling device, the called device, and the second calling device are placed in the conference call based on the fourth mapping.

18. The device of claim 11, where the one or more processors are further to:
   answer the second call request;
   place the second call request in a hold status based on the fifth mapping; and
   maintain the first dialog and the second dialog between the first calling device and the called device.

19. The device of claim 11, wherein the SIP based network element comprises a SIP based server which acts as a back to back user agent for a SIP device associated with the called device.

20. The method of claim 1, wherein the one or more analog input signals include a hookswitch flash signal.

21. The device of claim 11, wherein the set of analog input signals comprises a set of dual tone multi frequency (DTMF) tones.

22. A non-transitory computer-readable medium storing instructions, the instructions comprising:
   one or more instructions that, when executed by one or more processors, cause the one or more processors to:
      receive a first call request to establish a call between a first calling device and a called device;
      establish a first dialog between a session initiation protocol (SIP) based network element and the called device based on receiving the first call request;
      establish a second dialog between the SIP based network element and the first calling device based on receiving the first call request;
      receive a second call request to establish a call between a second calling device and the called device;
      establish a third dialog between the SIP based network element and the second calling device based on the second call request;
      establish a fourth dialog between the SIP based network element and the called device based on the second call request;
      alert the called device to the second call request via the fourth dialog;
      wait for a response from the called device via the fourth dialog based on alerting the called device;
      perform a default action if the response is not received within a predetermined period of time; and
      determine an action, identified in the response from the called device, and manage a disposition of the second call request by performing the action if the response is received within the predetermined period of time,
      the response being received as a SIP message that is identified based on a mapping between least one SIP message and a corresponding at least one analog input signal,
      the mapping including:
         a first mapping, between a first SIP message and a first analog input signal that indicates that the called device is to answer the second call request, if the action indicates to answer the second call request,
         a second mapping, between a second SIP message and a second analog input signal that indicates that the second call request is to be forwarded to a destination device, if the action indicates to forward the second call request,
         a third mapping, between a third SIP message and a third analog input signal that indicates that the second call request is to be dropped, if the action indicates to drop the second call request,
         a fourth mapping, between a fourth SIP message and a fourth analog input signal that indicates that the called device, the first calling device, and the second calling device are to be placed in a conference call, if the action indicates to place the second call request in the conference call, and
         a fifth mapping, between a fifth SIP message and a fifth analog input signal that indicates that the second call request is to be placed on hold, if the action indicates to place the second call request on hold.

23. The method of claim 1, where the default action includes at least one of:
   answering the second call request,
   forwarding the second call request,
   dropping the second call request,
   placing the first calling party device and the second calling party device in a conference call, or
   placing the second call request on hold.

24. The device of claim 11, where the default action indicates to forward the second call request, drop the second call request, or place the second call request on hold.

* * * * *